(12) United States Patent
Hashimoto et al.

(10) Patent No.: US 10,497,343 B2
(45) Date of Patent: Dec. 3, 2019

(54) REED FOR A MUSICAL INSTRUMENT

(71) Applicant: Yamaha Corporation, Hamamatsu-shi, Shizuoka (JP)

(72) Inventors: Ryuji Hashimoto, Hamamatsu (JP); Ryo Shinoda, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 16/116,403

(22) Filed: Aug. 29, 2018

(65) Prior Publication Data
US 2018/0366095 A1 Dec. 20, 2018

Related U.S. Application Data

(63) Continuation of application No. PCT/JP2017/005501, filed on Feb. 15, 2017.

(30) Foreign Application Priority Data

Mar. 2, 2016 (JP) .................................. 2016-040123

(51) Int. Cl.
  *G10D 9/02* (2006.01)
  *G01H 11/08* (2006.01)
  *G10H 3/16* (2006.01)

(52) U.S. Cl.
  CPC ............. *G10D 9/023* (2013.01); *G01H 11/08* (2013.01); *G10D 9/02* (2013.01); *G10H 3/16* (2013.01)

(58) Field of Classification Search
  CPC .......... G10D 9/023; G10D 9/02; G01H 11/08; G10H 3/16

USPC ........................................................ 84/383 A
  See application file for complete search history.

(56) References Cited

U.S. PATENT DOCUMENTS

| | | | | |
|---|---|---|---|---|
| 2,138,500 A * | 11/1938 | Miessner | ................. | G10H 3/16 84/283 |
| 2,383,553 A * | 8/1945 | Johnson | .................... | H04R 1/46 84/383 R |
| 2,494,390 A * | 1/1950 | Johnson | ................... | G10H 3/16 84/383 R |
| 3,558,795 A * | 1/1971 | Barcus | ..................... | G10D 9/00 84/730 |

(Continued)

FOREIGN PATENT DOCUMENTS

| DE | 3839230 A1 | 5/1990 |
|---|---|---|
| JP | 2002278556 A * | 9/2002 |
| JP | 3680748 B2 | 8/2005 |

OTHER PUBLICATIONS

International Search Report (PCT/ISA/210) issued in PCT Application No. PCT/JP2017/005501 dated Apr. 11, 2017 with English translation (seven (7) pages).

(Continued)

*Primary Examiner* — David S Warren
*Assistant Examiner* — Christina M Schreiber
(74) *Attorney, Agent, or Firm* — Crowell & Moring LLP

(57) ABSTRACT

A reed includes: a reed main body having a plate shape, the reed main body including a fixed part fixed to a mouthpiece, and a vibrating part that extends from the fixed part and vibrates; and a sensor part that is disposed inside the vibrating part or on an inner surface of the vibrating part, the inner surface of the vibrating part facing the mouthpiece, the sensor part comprising an effective sensor portion that detects vibration of the vibrating part.

10 Claims, 8 Drawing Sheets

(56) References Cited

U.S. PATENT DOCUMENTS

| | | | | |
|---|---|---|---|---|
| 6,002,080 A * | 12/1999 | Tanaka | ............... | G10D 7/00 |
| | | | | 84/609 |
| 6,538,189 B1 * | 3/2003 | Ethington | ............ | G10H 1/34 |
| | | | | 84/615 |
| 8,148,623 B2 * | 4/2012 | Masuda | ............ | G10H 1/0008 |
| | | | | 84/723 |
| 9,653,057 B2 * | 5/2017 | Harada | ............ | G10H 1/46 |
| 9,984,669 B2 * | 5/2018 | Toyama | ............ | G10H 1/0551 |
| 10,170,091 B1 * | 1/2019 | Tabata | ............ | G10H 1/0551 |
| 10,199,023 B2 * | 2/2019 | Pouillard | ............ | G10H 1/053 |
| 2005/0217464 A1 * | 10/2005 | Onozawa | ............ | G10H 1/055 |
| | | | | 84/723 |
| 2007/0068372 A1 * | 3/2007 | Masuda | ............ | G10H 1/0008 |
| | | | | 84/723 |
| 2016/0275929 A1 * | 9/2016 | Harada | ............ | G10H 1/46 |
| 2018/0075831 A1 * | 3/2018 | Toyama | ............ | G10H 1/0551 |
| 2018/0090120 A1 * | 3/2018 | Kasuga | ............ | G10H 1/043 |
| 2018/0218720 A1 * | 8/2018 | Smith | ............ | G10H 3/125 |
| 2018/0366095 A1 * | 12/2018 | Hashimoto | ............ | G01H 11/08 |
| 2019/0019485 A1 * | 1/2019 | Toyama | ............ | G10H 1/0008 |

OTHER PUBLICATIONS

European Office Action cited in European Application No. 17759660.8 dated Oct. 10, 2019, Eight (8) pages.

* cited by examiner

REED FOR A MUSICAL INSTRUMENT

CROSS-REFERENCE TO RELATED APPLICATIONS

The present application is a continuation application of International Application No. PCT/JP2017/005501, filed Feb. 15, 2017, which claims priority to Japanese Patent Application No. 2016-040123, filed Mar. 2, 2016. The contents of these applications are incorporated herein by reference.

BACKGROUND OF THE INVENTION

Field of the Invention

The present invention relates to a reed for a musical instrument.

Description of Related Art

Woodwind musical instruments such as saxophones, clarinets and the like produce sound by causing a reed attached to a mouthpiece to vibrate.

Japanese Patent No. 3680748 (hereinafter Patent Document 1) discloses a configuration in which a sensor for detecting strain (stress) of a reed, is attached to a portion of the reed (a reed fixed part) that is clamped and fixed on a mouthpiece by means of a ligature or the like.

SUMMARY OF THE INVENTION

However, in the configuration of Patent Document 1, vibration of a portion of the reed (vibrating portion) adjacent to the fixed part is transmitted to the reed fixed part, whereby the sensor detects the vibration of the reed. For this reason, the vibration waveform detected by the sensor differs from the waveform of the emitted sound (raw sound) of the woodwind musical instrument that is produced as a result of the vibration of the reed. That is to say, the vibration of the reed cannot be correctly detected by the sensor. In this case, it is difficult to use the vibration waveform output from the sensor as a sound signal.

For example, it is conceivable to attach the sensor to the vibrating part of the reed. However, the player's lips come into contact with the vibrating part. For this reason, simply attaching the sensor to the vibrating part is undesirable because there is a possibility that the player may feel discomfort due to the sensor.

The present invention has been made in view of the above circumstances. An example of an object of the present invention is to provide a reed which can correctly detect vibration of the reed and can be played by a player with the same feeling as for a musical instrument to which a reed having no sensor is attached.

A reed according to an aspect of the present invention includes: a reed main body having a plate shape, the reed main body including a fixed part fixed to a mouthpiece, and a vibrating part that extends from the fixed part and vibrates; and a sensor part that is disposed inside the vibrating part or on an inner surface of the vibrating part, the inner surface of the vibrating part facing the mouthpiece, the sensor part including an effective sensor portion that detects vibration of the vibrating part.

A reed according to an aspect of the present invention includes: a reed main body having a plate shape, the reed main body including a fixed part fixed to a mouthpiece, and a vibrating part that extends from the fixed part and vibrates. The vibrating part includes a through hole that penetrates in a thickness direction of the reed main body, and through which a sensor part is inserted, the sensor part detecting vibration of the vibrating part.

According to the embodiment of the present invention, the effective sensor portion is disposed on the vibrating part. Therefore, the vibration of the reed main body (the vibrating part in particular) can be correctly detected by the sensor part.

In addition, the effective sensor portion is not exposed on the outer surface (the surface of the vibrating part facing away from the inner surface) of the vibrating part to be touched by the player's lips. Hence the effective sensor portion can be prevented from touching the player's lips.

Therefore, the player can play with the same feeling as for a musical instrument to which a reed having no sensor part is attached.

EMBODIMENTS FOR CARRYING OUT THE INVENTION

[First Embodiment]

Hereinafter, a first embodiment of the present invention will be described with reference to FIG. 1 to FIG. 3.

Figure 1:
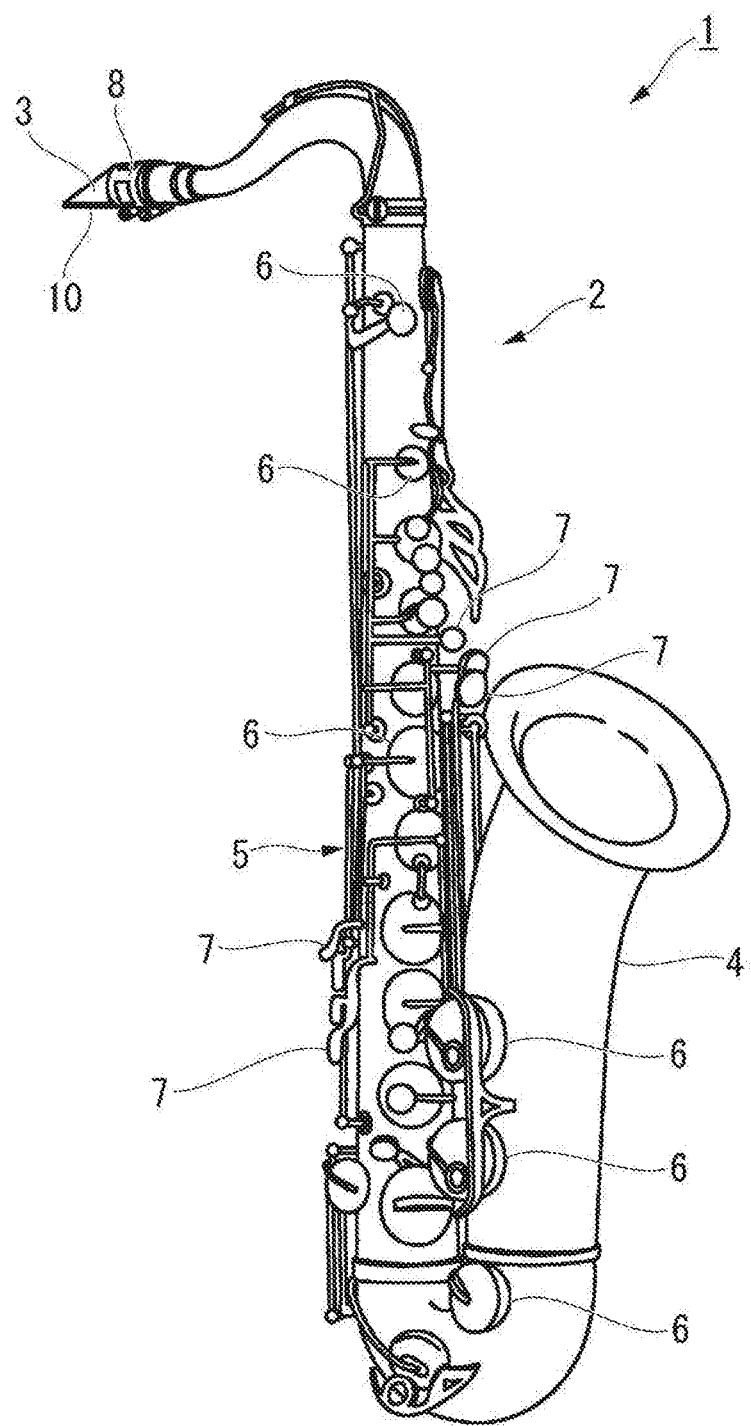
FIG. 1 is a schematic diagram showing an example of a woodwind musical instrument using a reed according to a first embodiment of the present invention.

The reed according to the first embodiment is used for a single-reed woodwind musical instrument 1 such as saxophone exemplified in FIG. 1.

The woodwind musical instrument 1 shown in FIG. 1 includes a musical instrument main body 2, a mouthpiece 3 attached to one end of the musical instrument main body 2, and a reed 10 of the first embodiment attached to the mouthpiece 3.

The musical instrument main body 2 has a tube body 4 having a plurality of tone holes formed therein. The tube body 4 is formed so that the diameter dimension thereof increases in the axial direction from a first end to which the mouthpiece 3 is attached, toward a second end which forms a bell. The tube body 4 shown in the figure is bent. However, the shape of the tube body is not limited this.

The tone holes of the tube body 4 may be directly opened and closed by, for example, the fingers of the player. However, in the example shown in the figure, they are opened and closed using a key mechanism 5 (key system). That is to say, the musical instrument main body 2 includes the key mechanism 5 for opening and closing the plurality of tone holes respectively. The key mechanism 5 includes a plurality of keypads 6 for opening and closing the respective tone holes, and a plurality of levers 7 each connected to each of the keypads 6, for operating the respective keypads 6 with the fingers of the player.

Figure 2:
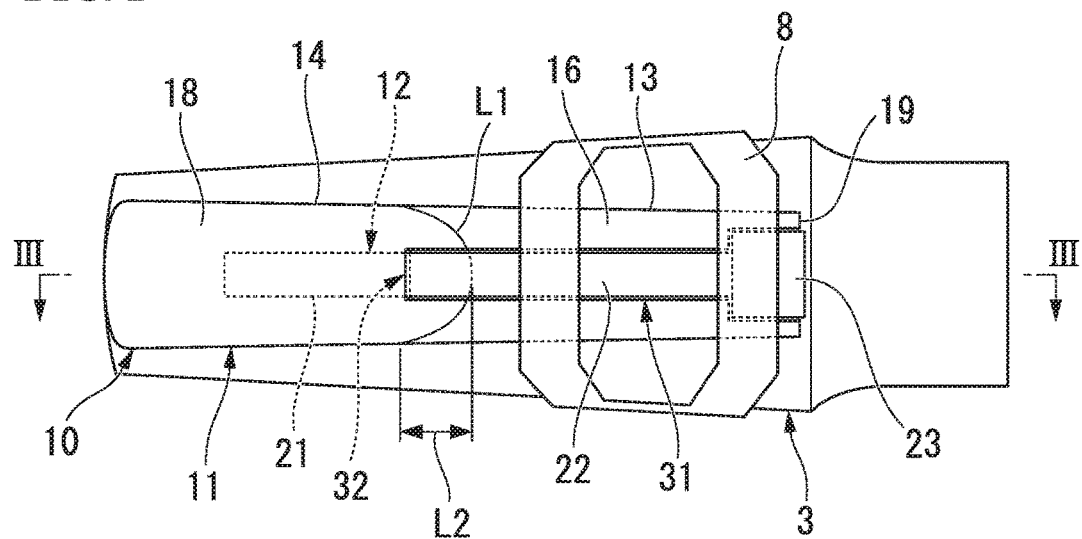
FIG. 2 is a schematic plan view of a state of the reed according to the first embodiment of the present invention being attached to a mouthpiece, as viewed from an outer surface side of a reed main body.
Figure 3:
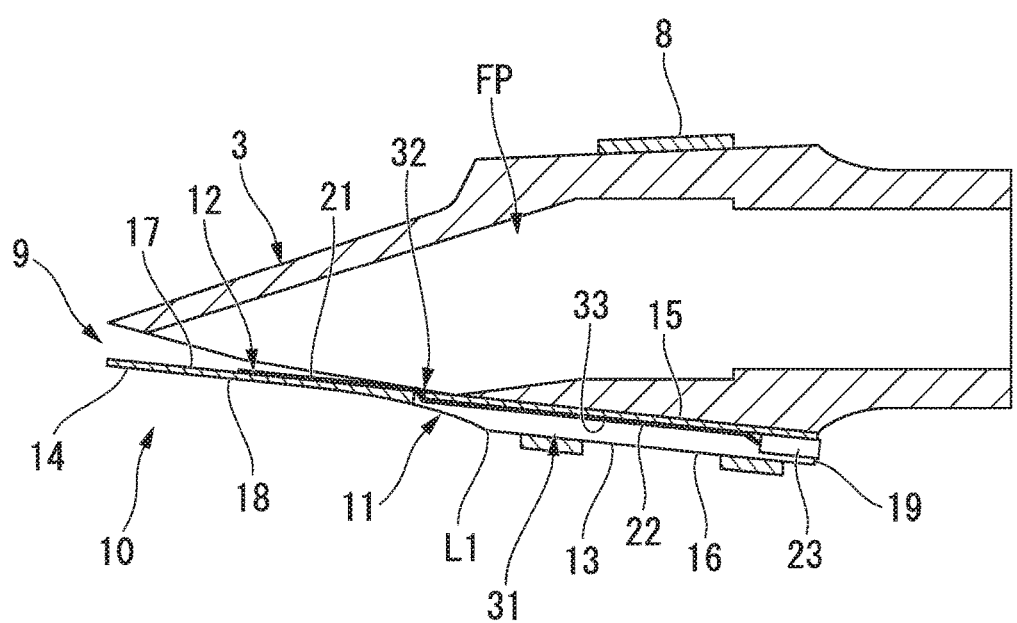
FIG. 3 is a cross-sectional view taken along the line III-III as viewed in the direction of the arrow shown in FIG. 2.

As shown in FIG. 2 and FIG. 3, the mouthpiece 3 is formed in a cylindrical shape. A first end part of the mouthpiece 3 in the axial direction to which the musical instrument main body 2 is connected is formed in a cylindrical shape. A second end part of the mouthpiece 3 which the player holds with their mouth is formed in a flatter cylindrical shape as compared with the first end part. The mouthpiece 3 opens toward the lower side (the side that comes in contact with the lower lip of the player) on the second end part side. The opening on the second end part side of the mouthpiece 3 together with the reed 10 constitutes a blowing opening 9 into which the player blows air.

A part of the reed 10 (a first fixed part 13 described later) is fixed to the first end part of the mouthpiece 3 by a ligature 8. In this state, the remaining part of the reed 10 (a vibrating part 14 described later) is disposed so as to face the opening on the second end part side of the mouthpiece 3. As the mouthpiece 3 and the ligature 8, those having a conventional configuration can be used.

The reed 10 according to the first embodiment includes a reed main body 11 and a sensor part 12.

The reed main body 11 is formed in a plate shape having a planar rectangular shape. That is to say, the reed main body 11 has a rectangular shape when viewed from the thickness (plate thickness) direction of the reed main body 11 (the direction orthogonal to the lengthwise direction and the widthwise direction of the reed main body 11). In the following description, the direction along the long edge of the reed main body 11 is referred to as the lengthwise direction of the reed main body 11, and the direction along the short edge of the reed main body 11 is referred to as the widthwise direction of the reed main body 11.

The reed main body 11 has a fixed part 13 fixed to the first end part of the mouthpiece 3 and a vibrating part 14 formed to extend from the fixed part 13. The fixed part 13 and the vibrating part 14 are arranged in the lengthwise direction of the reed main body 11.

The fixed part 13 has an inner surface 15 which is a surface that comes in contact with the first end part of the mouthpiece 3. The inner surface 15 is formed so as to come in surface contact with the first end part. For example, in the case where the area of the mouthpiece 3 that comes in contact with the fixed part 13 is formed flat, the inner surface 15 of the fixed part 13 is also formed as a flat surface.

Further, the fixed part 13 has an outer surface 16 which is a surface facing away from the inner surface 15. For example, the outer surface 16 may be formed as a flat surface. However, in the first embodiment, the reed main body 11 is formed in a convex curved surface as viewed from the lengthwise direction thereof. The thickness of the reed main body 11 of the fixed part 13 is constant in the lengthwise direction of the reed main body 11.

The vibrating part 14 is disposed so as to face the opening on the second end part side of the mouthpiece 3 in a state where the reed main body 11 is fixed to the mouthpiece 3. Between the mouthpiece 3 and the vibrating part 14 there is formed the blowing opening 9. When the player blows air into the mouthpiece 3 from the blowing opening 9, the vibrating part 14 vibrates so as to warp mainly in the plate thickness direction of the reed main body 11 with respect to the fixed part 13. The vibrating part 14 is not in contact with the mouthpiece 3 in the state where the reed main body 11 is fixed to the mouthpiece 3 and the vibrating part 14 is not vibrating. That is to say, the vibrating part 14 is not in contact with the mouthpiece 3 in the state where the reed main body 11 is fixed to the mouthpiece 3 and the vibrating part 14 is still.

The vibrating part 14 has an inner surface 17 which faces the mouthpiece 3. The inner surface 17 is formed as a flat surface and is smoothly connected to the inner surface 15 of the fixed part 13. In the following description, the inner surfaces 15, 17 of the fixed part 13 and the vibrating part 14 may be referred to as the inner surfaces 15, 17 of the reed main body 11 in some cases.

Further, the vibrating part 14 has an outer surface 18 that faces away from the inner surface 17. On the outer surface 18 there is formed a bump that reduces the plate thickness of the reed main body 11 as it distances away from the fixed part 13 in the lengthwise direction of the reed main body 11. In FIG. 2, an arcuate line denoted by reference symbol L1 is a boundary line, which emerges as a result of the formation of the bump, between the outer surface 16 of the fixed part 13 and the outer surface 18 of the vibrating part 14. In the following description, the outer surfaces 16, 18 of the fixed part 13 and the vibrating part 14 may be referred to as the outer surfaces 16, 18 of the reed main body 11 in some cases.

A specific example of the material of the reed main body 11 is a material similar to that of a normal reed without the sensor part 12, such as a woody material or a resin material. A reed (cane) material is common as a woody material. As the woody material, other materials such as wood, bamboo, and the like may also be used. As the resin material, for example, polypropylene can be used. In addition, for example, a composite material containing wood fibers or bamboo fibers in a resin can also be used as a material for forming the reed main body 11.

Considering the processing of the reed main body 11 for forming a groove 31 and a through hole, which will be described later, and the installation of the sensor part 12 on the reed main body 11, it is preferable to use a resin material as the material of the reed main body 11.

The sensor part 12 includes an effective sensor portion 21, a tail part 22, and a connector part 23.

The effective sensor portion 21 is formed in a film shape. While the shape of the effective sensor portion 21 in plan view may be arbitrary, it is rectangular in the first embodiment. The effective sensor portion 21 is disposed so as to overlap with the inner surface 17 of the vibrating part 14 of the reed main body 11. The effective sensor portion 21 is fixed to the inner surface 17 of the vibrating part 14 by means of, for example, an adhesive agent or a double-sided tape.

The effective sensor portion 21 detects vibration of the vibrating part 14. Specifically, the effective sensor portion 21 detects strain in the lengthwise direction of the reed main body 11 at least in the vibrating part 14. The effective sensor portion 21 may detect strain in the vibrating part 14 for example in the widthwise direction of the reed main body 11.

As the effective sensor portion 21, for example, a piezoelectric strain sensor, a metal strain sensor, or the like is used.

As the piezoelectric strain sensor, a layer formed by laminating electrode layers on both sides of a layer (piezoelectric material layer) formed from a piezoelectric material can be used. The piezoelectric material may be a polymeric piezoelectric material such as polyvinylidene fluoride (PVDF), or a piezoelectric material such as a composite material in which fine powder of piezoelectric ceramics such as lead zirconate titanate (PZT) is dispersed in a resin.

As the metal strain sensor, it is possible to use one in which end parts of stripe-shaped thin metal wires which are formed of a metal foil such as copper-nickel alloy (constantan) are alternately connected to thereby connect the thin metal wires in series.

As the effective sensor portion 21, a piezoelectric strain sensor that uses polyvinylidene fluoride as a piezoelectric material is preferably used among the piezoelectric strain sensor and the metal strain sensor mentioned above. As a piezoelectric strain sensor that uses polyvinylidene fluoride, there is, for example, one in which an electrode layer and a protective sheet such as PET are laminated in this order on both sides of the above-described piezoelectric material layer.

The effective sensor portion 21 is disposed so as to extend in the lengthwise direction of the reed main body 11. Moreover, the effective sensor portion 21 is disposed in the widthwise center region of the reed main body 11 on the inner surface 17 of the vibrating part 14. The dimensions in the lengthwise direction, the widthwise direction, and the plate thickness direction of the effective sensor portion 21 may be set so as not to adversely affect the vibration characteristics of the reed main body 11, and so that vibration of the vibrating part 14 can be detected by the effective sensor portion 21.

The first end in the lengthwise direction of the effective sensor portion 21 may be positioned for example at the boundary between the fixed part 13 and the vibrating part 14. In the first embodiment, the first end of the effective sensor portion 21 is positioned at the fixed part 13 side end part of the vibrating part 14 so that the force of the ligature 8 pressing the fixed part 13 of the reed main body 11 against the mouthpiece 3 does not act on the effective sensor portion 21. More specifically, the first end of the effective sensor portion 21 is positioned within a range in the vibrating part 14 where the boundary line L1 between the fixed part 13 and the vibrating part 14 is formed, in the lengthwise direction of the reed main body 11 (the range indicated by reference symbol L2 in FIG. 2).

The second end in the lengthwise direction of the effective sensor portion 21 need only be positioned at least more distanced from the fixed part 13 in the lengthwise direction of the reed main body 11 than from the first end. The position of the second end of the effective sensor portion 21 may be set so as not to adversely affect the vibration characteristics of the reed main body 11, and so that vibration of the vibrating part 14 can be detected by the effective sensor portion 21.

The tail part 22 is formed to extend from the effective sensor portion 21 described above. The tail part 22 may be, for example, an electrical wiring electrically connected to the effective sensor portion 21. However in the first embodiment, the tail part 22 is configured in a manner similar to that of the effective sensor portion 21. That is to say, the tail part 22 of the first embodiment detects the vibration of the reed main body 11 in a manner similar to that of the effective sensor portion 21.

The tail part 22 is disposed mainly inside the fixed part 13. The tail part 22 disposed inside the fixed part 13 may for example form the same surface (for example, a flat surface) together with the inner surface 15 and the outer surface 16 of the fixed part 13. In the first embodiment, the tail part 22 is positioned between the inner surface 15 and the outer surface 16 of the fixed part 13 in the plate thickness direction of the reed main body 11, and it is covered by the inner surface 15 side portion of the fixed part 13. That is to say, in the first embodiment, the inner surface 15 of the fixed part 13 is formed in a manner similar to that of the normal reed without the sensor part 12.

The connector part 23 is provided at the tip end of the tail part 22 that extends from the effective sensor portion 21, and is electrically connected to the effective sensor portion 21 and the tail part 22. The connector part 23 is a portion that detachably connects the effective sensor portion 21 and the tail part 22 to an amplifier and a signal processing device (not shown in the figure).

The connector part 23 is disposed inside the fixed part 13 as with the tail part 22. In the first embodiment, the connector part 23 that is disposed inside the fixed part 13 is positioned between the inner surface 15 and the outer surface 16 of the fixed part 13 in the plate thickness direction of the reed main body 11, and it is covered by the inner surface 15 side portion of the fixed part 13.

The connector part 23 is exposed to the outer side from the end surface 19 of the fixed part 13 in the lengthwise direction of the reed main body 11.

Next, a specific arrangement structure of the sensor part 12 with respect to the reed main body 11 will be described.

In the reed main body 11 there is formed a groove part 31 for accommodating the tail part 22 and the connector part 23 of the sensor part 12. The groove part 31 is formed in the widthwise center region of the reed main body 11, and extends in the lengthwise direction of the reed main body 11. The groove part 31 is formed throughout the fixed part 13 in the lengthwise direction of the reed main body 11. The groove part 31 need not be formed in the vibrating part 14, for example. However, in the first embodiment, it is formed in both the fixed part 13 and the vibrating part 14.

The first end in the lengthwise direction of the groove part 31 opens to the end surface 19 of the fixed part 13 in the lengthwise direction of the reed main body 11. The second end in the lengthwise direction of the groove portion 31 may be disposed at an arbitrary position on the vibrating part 14 in the lengthwise direction of the reed main body 11. For example, the second end in the lengthwise direction of the groove part 31 may be positioned on the boundary line L1 between the fixed part 13 and the vibrating part 14. In the first embodiment, the vibration characteristics of the vibrating part 14 is considered, and the second end of the groove part 31 is arranged in a position within a range in the vibrating part 14 where the boundary line L1 is formed between the fixed part 13 and the vibrating part 14 in the lengthwise direction of the reed main body 11 (the range indicated by reference symbol L2 in FIG. 2).

In the first embodiment, the groove part 31 is formed recessed from the outer surfaces 16, 18 of the reed main body 11. The tail part 22 and the connector part 23 of the sensor part 12 are fixed to the bottom surface 33 of the groove part 31 by means of an adhesive agent or a double-sided tape.

The tail part 22 is arranged close to the second end side of the groove part 31. As a result, the tail part 22 is disposed mainly in the fixed part 13, but it is also disposed in the vibrating part 14. More specifically, the tail part 22 is positioned at the fixed part 13 side end part of the vibrating part 14 (within the range indicated by reference symbol L2 in FIG. 2) so as not to touch the player's lips.

The connector part 23 is arranged close to the first end side of the groove part 31. As a result, the connector part 23 is exposed to the outer side from the end surface 19 of the fixed part 13.

The dimension (depth dimension) of the groove part 31 in the plate thickness direction of the reed main body 11 is set so that the tail part 22 and the connector part 23 disposed in the groove part 31 do not protrude from the outer surfaces 16, 18 of the fixed part 13 and the vibrating part 14. As a result, the tail part 22 and the connector part 23 are disposed inside the fixed part 13 and the vibrating part 14.

In the first embodiment, the thickness dimensions of the tail part 22 and the connector part 23 are different from each other. Therefore, the depth dimension of the groove part 31 may be different between the accommodation region for the tail part 22 and the accommodation region for the connector part 23 in the groove part 31. However, in the first embodiment it is set to be constant.

The dimension (width dimension) of the groove part 31 in the widthwise direction of the reed main body 11 may be set to be constant, for example. However, in the first embodiment, it is set to correspond to each of the width dimensions of the tail part 22 and the connector part 23. In the first embodiment, since the width dimensions of the tail part 22 and the connector part 23 are different from each other, a step is formed at the boundary between the accommodation region for the tail part 22 and the accommodation region for the connector part 23 in the groove part 31. As a result, the tail part 22 and the connector part 23 can be easily positioned in the groove part 31.

Moreover, in the reed main body 11 of the first embodiment, there is formed a through hole 32 that penetrates therethrough in the plate thickness direction thereof. The through hole 32 is positioned at the center in the widthwise direction of the reed main body 11, and is formed in a slit shape extending in the widthwise direction of the reed main body 11 as viewed from the plate thickness direction of the reed main body 11.

The through hole 32 may be formed, for example, on the vibrating part 14 side end part of the fixed part 13 or on the boundary line L1 between the fixed part 13 and the vibrating part 14. However, in the first embodiment, the through hole 32 is formed in the end part on the fixed part 13 side of the vibrating part 14. More specifically, the through hole 32 is formed at a position within a range in the vibrating part 14 where the boundary line L1 between the fixed part 13 and the vibrating part 14 is formed, in the lengthwise direction of the reed main body 11 (the range indicated by reference symbol L2 in FIG. 2).

In the first embodiment, the through hole 32 opens to the bottom surface 33 of the groove part 31 mentioned above. Moreover, the through hole 32 is positioned at the second end in the lengthwise direction of the groove part 31.

The sensor part 12 is inserted through the through hole 32. As a result, the effective sensor portion 21 can be arranged on the inner surface 17 of the vibrating part 14, and the tail part 22 connected to the effective sensor portion 21 can be arranged on the bottom surface 33 of the groove part 31 recessed from the outer surfaces 16, 18 of the reed main body 11.

In the state where the sensor part 12 is inserted through the through hole 32, the through hole 32 may be blocked by the sensor part 12 inserted therethrough and a blocking part (not shown in the figure) made of resin or the like. As a result, it is possible to prevent the airtightness of the air blowing flow path FP constituted by the mouthpiece 3 and the reed 10 attached to the mouthpiece 3 from being obstructed by the through hole 32.

According to the reed 10 of the first embodiment configured as described above, the effective sensor portion 21 is disposed in the vibrating part 14 of the reed main body 11. Therefore, the vibration of the reed main body 11 can be correctly detected by the sensor part 12.

Moreover, according to the reed 10 of the first embodiment, the effective sensor portion 21 is disposed on the inner surface 17 of the vibrating part 14. That is to say, the effective sensor portion 21 is not exposed on the outer surface 18 of the vibrating part 14, which touches the player's lips. Therefore it is possible to prevent the effective sensor portion 21 from touching the player's lips. Consequently, the player can play the woodwind musical instrument 1 with the same feeling as for a normal reed without the sensor part 12.

Furthermore, according to the reed 10 of the first embodiment, the tail part 22 and the connector part 23 are disposed within the fixed part 13. As a result, irregularities due to the tail part 22 and the connector part 23 do not appear on the inner surface 15 of the fixed part 13 that comes in contact with the mouthpiece 3. In particular, in the first embodiment the tail part 22 and the connector part 23 are not exposed on the inner surface 15 of the fixed part 13. Therefore the inner surface 15 of the fixed part 13 can be formed in a manner similar to that of a normal reed without the sensor part 12, and it is possible to suppress or prevent a gap occurring between the mouthpiece 3 and the inner surface 15 of the fixed part 13. Consequently it is possible to ensure the airtightness of the air blowing flow path FP constituted by the mouthpiece 3 and the reed 10.

Moreover, according to the reed 10 of the first embodiment, in the reed main body 11 there is formed the through hole 32 that penetrates therethrough in the plate thickness direction thereof. Therefore, by merely inserting the sensor part 12 into the through hole 32 of the reed main body 11, it is possible to easily position the effective sensor portion 21 on the inner surface 17 side of the reed main body 11, and to position the tail part 22 to the outer surface 16 side of the reed main body 11 from the sensor part 21.

Furthermore, according to the reed 10 of the first embodiment, the tail part 22 and the connector part 23 are accommodated in the groove part 31 formed in the outer surface 16 of the fixed part 13. As a result, the tail part 22 and the connector part 23 are not sandwiched between the reed 10 and the ligature 8 even if they are exposed on the outer surface 16 of the reed main body 11. Therefore protection of the tail part 22 and the connector part 23 can be ensured.

[Second Embodiment]

Next, a second embodiment of the present invention will be described with reference to FIG. 4 and FIG. 5. A reed of the second embodiment differs from the reed of the first embodiment only in the configuration of the reed main body. The reed of the second embodiment is similar to the reed of the first embodiment with respect to other configurations. In the second embodiment, the same reference symbols are given to constituents similar to those in the first embodiment, and the descriptions thereof are omitted.

Figure 4:
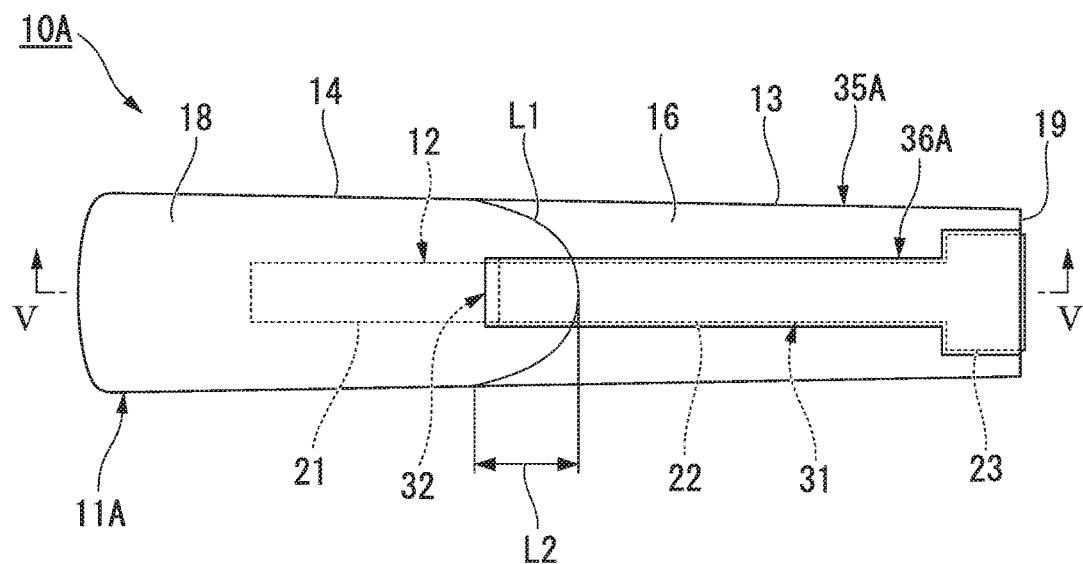
FIG. 4 is a schematic plan view of a state of a reed according to a second embodiment of the present invention being attached to a mouthpiece, as viewed from an outer surface side of a reed main body.
Figure 5:
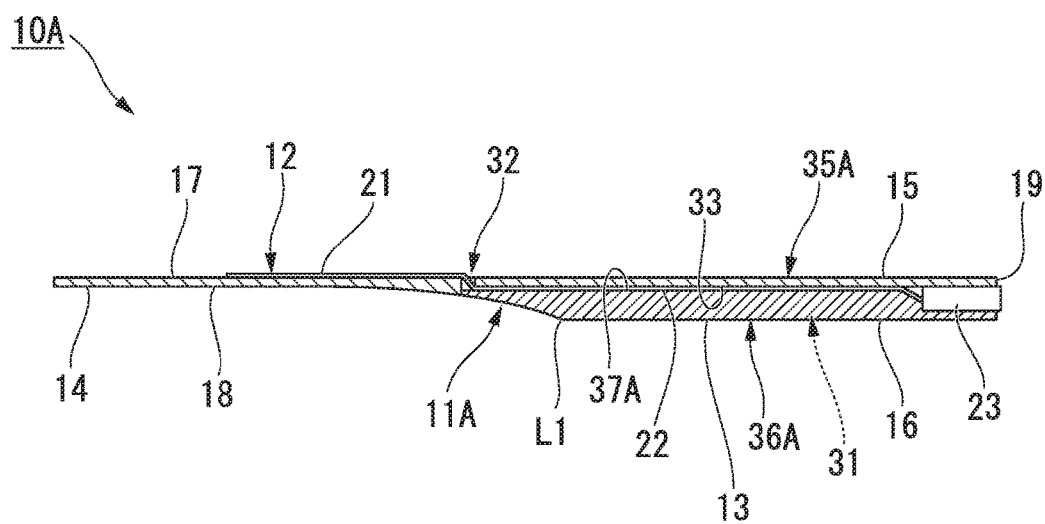
FIG. 5 is a cross-sectional view taken along the line V-V as viewed in the direction of the arrow shown in FIG. 4.

As shown in FIG. 4 and FIG. 5, a reed 10A according to the second embodiment includes a reed main body 11A and a sensor part 12 as with the first embodiment. The reed main body 11A of the second embodiment is composed of two members (a first member 35A and a second member 36A).

The first member 35A is similar to the reed main body 11A of the first embodiment and has a groove part 31 and a through hole 32.

The second member 36A is inserted into the groove part 31 of the first member 35A and covers the tail part 22 and the connector part 23 of the sensor part 12 accommodated in the groove part 31. As a result, the tail part 22 and the connector part 23 are not exposed on the inner surfaces 15, 17 and the outer surfaces 16, 18 of the reed main body 11A (particularly the fixed part 13). That is to say, they are embedded in the reed main body 11A (particularly the fixed part 13). Moreover, the second member 36A covers the through hole 32 of the first member 35A from the outer surface 18 side of the vibrating part 14.

The second member 36A is formed so as to have an external appearance similar to that of a normal reed without the sensor part 12, in the state where the second member 36A is attached to the first member 35A. That is to say, in the state where the second member 36A is inserted into the groove part 31 of the first member 35A, an appearance of irregularities due to the first member 35A and the second member 36A on the respective outer surfaces 16, 18 of the fixed part 13 and the vibrating part 14 will be none or minute.

For example, the second member 36A may be formed so that a cavity part surrounded by the groove part 31 and the second member 36A is formed in the fixed part 13 in the state where the second member 36A is attached to the first member 35A. In the second embodiment, in consideration of the change in the vibration characteristic of the reed 10A due to the cavity part, the second member 36A is formed so as to fill the space in the groove part 31 in which the tail part 22 and the connector part 23 are accommodated. The second member 36A has a facing surface 37A opposed to a bottom surface 33 of the groove part 31. For example, the facing surface 37A is formed so as to come in surface contact with the tail part 22 and the connector part 23 fixed to the bottom surface 33 of the groove part 31. Moreover, the second member 36A is formed so as to fill a gap on the inner surface of the groove part 31 that extends from the bottom surface 33 of the groove part 31 toward the outer surfaces of the first member 35A (outer surfaces 16, 18).

The second member 36A is fixed to the first member 35A and the tail part 22, and the connector part 23 by means of an arbitrary method such as bonding, adhesion, or welding.

According to the reed 10A of the second embodiment, an effect similar to that of the first embodiment is achieved.

Furthermore, according to the reed 10 of the second embodiment, the tail part 22 and the connector part 23 are embedded the fixed part 13. Therefore, both the inner surface 15 and the outer surface 16 of the fixed part 13 can be formed in a manner similar to that of a normal reed without the sensor part 12. As a result, the mode of pressing the reed 10A against the mouthpiece 3 by means of the ligature 8 can be made similar to that of the case of the normal reed. Therefore airtightness of the air blowing flow path FP constituted by the mouthpiece 3 and the reed 10A can be further ensured.

Further, since the tail part 22 is embedded in the fixed part 13, the tail part 22 is not sandwiched between the mouthpiece 3 and the reed 10A, or between the reed 10A and the ligature 8. Therefore it is also possible to protect the tail part 22.

Moreover, according to the reed 10A of the second embodiment, the reed main body 11A is composed of the two members (the first member 35A and the second member 36A). Therefore, the tail part 22 and the connector part 23 can be easily embedded in the fixed part 13. That is to say, the reed 10A having the sensor part 12 can be easily manufactured.

Further, according to the reed 10A of the second embodiment, since the portion of the tail part 22 positioned in the vibrating part 14 is embedded in the vibrating part 14, it is possible to reliably prevent the tail part 22 from touching the player's lips.

Moreover, according to the reed 10A of the second embodiment, the second member 36A covers the through hole 32 of the first member 35A from the outer surface 18 side of the vibrating part 14. Therefore, it is possible to prevent the airtightness of the air blowing flow path FP from being obstructed by the through hole 32, without using the separate blocking part mentioned in the first embodiment.

Further, according to the reed 10A of the second embodiment, the reed main body 11A has an external shape similar to that of the normal reed without the sensor part 12. Therefore, in the reed 10A of the second embodiment, compared with the reed 10 of the first embodiment, a feeling of playing more similar to that of the normal reed can be achieved.

[Third Embodiment]

Next, a third embodiment of the present invention will be described with reference to FIG. 6 and FIG. 7. A reed of the third embodiment differs from the reed of the first and second embodiments only in the configuration of the reed main body. The reed of the third embodiment is similar to the reed of the first and second embodiments with respect to other configurations. In the third embodiment, the same reference symbols are given to constituents similar to those in the first and second embodiments, and the descriptions thereof are omitted.

Figure 6:
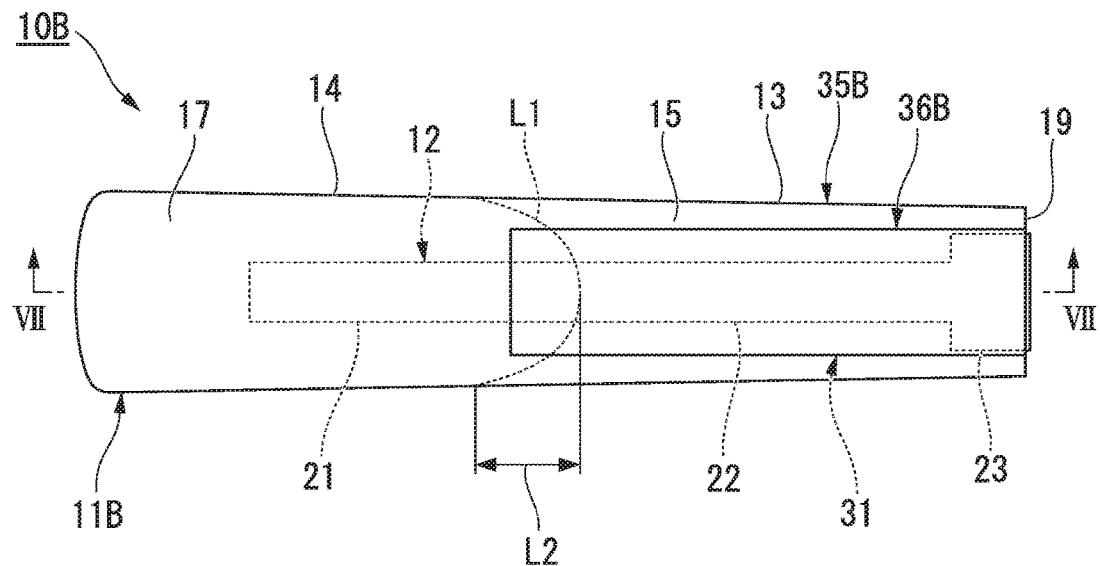
FIG. 6 is a schematic plan view of a state of a reed according to a third embodiment of the present invention being attached to a mouthpiece, as viewed from an inner surface side of a reed main body.
Figure 7:
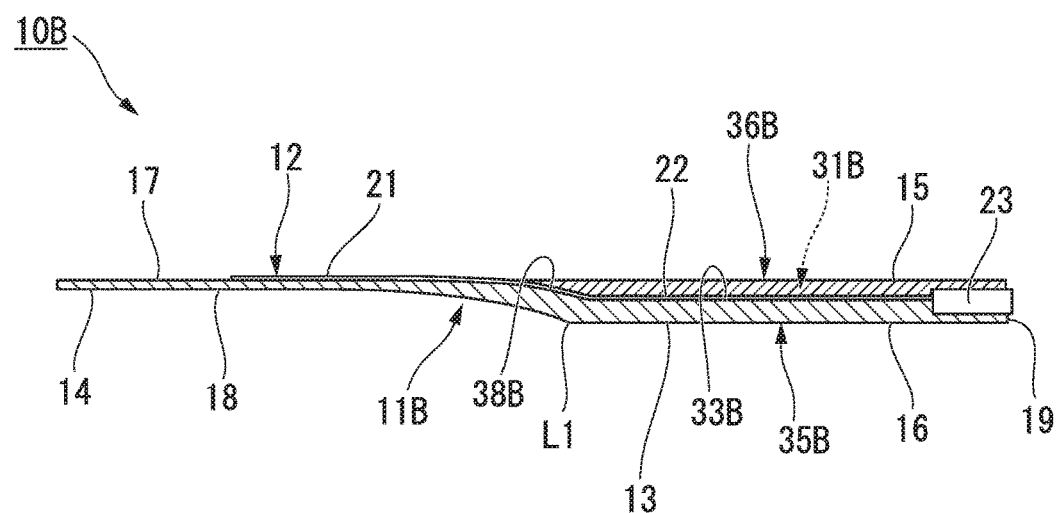
FIG. 7 is a cross-sectional view taken along the line VII-VII as viewed in the direction of the arrow shown in FIG. 6.

As shown in FIG. 6 and FIG. 7, a reed 10B according to the third embodiment includes a reed main body 11B and a sensor part 12 as with the first and second embodiments. As with the second embodiment, the reed main body 11B of the third embodiment has an external shape similar to that of the normal reed and is composed of two members (a first member 35B and a second member 36B).

As with the first member 35A of the second embodiment, in the first member 35B there is formed a groove part 31B for accommodating the tail part 22 and the connector part 23. The external shape of the first member 35B excluding the groove part 31B is similar to that of the normal reed.

As with the groove part 31B of the first embodiment, the groove part 31B of the first member 35B is formed in the widthwise center region of the reed main body 11B and extends in the lengthwise direction of the reed main body 11B. Moreover, the groove part 31B is formed throughout the fixed part 13 in the lengthwise direction of the reed main body 11B, and is formed to extend to the vibrating part 14. The first end in the lengthwise direction of the groove part 31B opens to the end surface 19 of the fixed part 13. The second end of the groove part 31B is arranged positioned within a range of the vibrating part 14 (a range indicated by reference symbol L2 in FIG. 6) where the boundary line L1 between the fixed part 13 and the vibrating part 14 is formed in the lengthwise direction of the reed main body 11B.

The groove part 31B of the third embodiment is formed recessed from the outer surfaces 15, 17 of the reed main body 11B. Moreover, the bottom surface 33B of the groove part 31B and the inner surface 17 of the vibrating part 14 are gently connected by an inclined surface 38B of the groove part 31B. The inclined surface 38B, with approach toward the inner surface 17 of the vibrating part 14 from the bottom surface 33B in the plate thickness direction of the reed main body 11B, inclines away from the fixed part 13 in the lengthwise direction of the reed main body 11B.

The depth dimension of the groove part 31B is different between the accommodation region for the tail part 22 and the accommodation region for the connector part 23 in the groove part 31B, so as to correspond to the difference in thickness dimension between the tail part 22 and the connector part 23. The width dimension of the groove part 31B is set to be constant.

The tail part 22 and the connector part 23 of the sensor part 12 are fixed to the bottom surface 33B of the groove part 31B by means of an adhesive agent or a double-sided tape. Moreover, the tail part 22 is similarly fixed to the inclined surface 38B of the groove part 31B.

As with the first and second embodiments, the effective sensor portion 21 is fixed to the inner surface 17 of the vibrating part 14 constituted by the first member 35B.

The second member 36B is configured in a manner similar to that of the second member 36B of the second embodiment. That is to say, the second member 36B is inserted into the groove part 31B of the first member 35B, and covers the tail part 22 and the connector part 23 of the sensor part 12 accommodated in the groove part 31B. Moreover, the second member 36B is formed so as to have an external shape similar to that of the normal reed without the sensor part 12, in the state where the second member 36B is attached to the first member 35B. Furthermore, the second member 36B is formed so as to fill the space in the groove part 31B in which the tail part 22 and the connector part 23 are accommodated.

The second member 36B may be fixed to the first member 35B and the tail part 22, and the connector part 23 by means of an arbitrary method such as for example bonding, adhesion, or welding. Furthermore, for example, the second member 36B may be formed by means of injection molding or the like, by arranging the first member 35B and the sensor part 12 in a mold after fixing the tail part 22 and the connector part 23 to the bottom surface 33B of the groove part 31B of the first member 35B.

According to the reed 10B of the third embodiment, an effect similar to that of the first embodiment is achieved.

Moreover, in the reed 10B of the third embodiment, the groove part 31B is formed recessed from the inner surfaces 15, 17 of the reed main body 11B. As a result, the bottom surface 33B of the groove part 31B faces in the same direction as the inner surface 17 of the vibrating part 14. Therefore the effective sensor portion 21, the tail part 22, and the connector part 23 can be collectively fixed to the first member 35B. That is to say, it is possible to easily perform installation of the sensor part 12 on the reed main body 11B.

[Fourth Embodiment]

Next, a fourth embodiment of the present invention will be described with reference to FIGS. 8 to 13B. A reed of the fourth embodiment differs from the reed of the first to third embodiments only in the configuration of the reed main body. The reed of the fourth embodiment is similar to the reed of the first to third embodiments with respect to other configurations. In the fourth embodiment, the same reference symbols are given to constituents similar to those in the first and second embodiments, and the descriptions thereof are omitted.

As shown in FIGS. 8 to 13B, reeds 10C, 10D, and 10E according to the fourth embodiment include reed main bodies 11C, 11D, and 11E, and a sensor part 12, as with the first to third embodiments.

In the reeds 10C, 10D, and 10E of the fourth embodiment, the entire sensor part 12 (the effective sensor portion 21 and the tail part 22) is embedded in the interior of the reed bodies 11C, 11D, and 11E. The effective sensor portion 21 and the tail part 22 extending in the lengthwise direction of the reed main bodies 11C, 11D, and 11E are disposed in the main bodies 11C, 11D, and 11E so as to be positioned intermediate of the reed main bodies 11C, 11D, and 11E in the plate thickness direction of the reed main bodies 11C, 11D, and 11E.

In the sensor part 12 of the fourth embodiment, the boundary between the effective sensor portion 21 and the tail part 22 is positioned on the fixed part 13 side end part of the vibrating part 14 (a range indicated by reference symbol L2 in FIGS. 8, 10, and 12), in consideration of vibration detection of the vibrating part 14 by the effective sensor portion 21.

Figure 8:
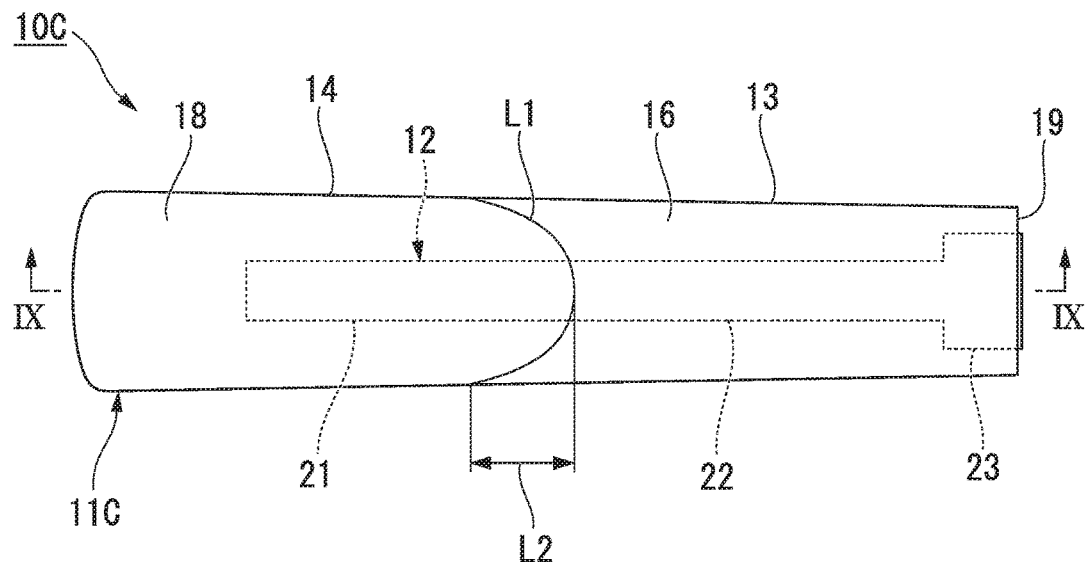
FIG. 8 is a schematic plan view of a first example of a reed according to a fourth embodiment of the present invention, as viewed from an outer surface side of the reed main body.
Figure 9A:
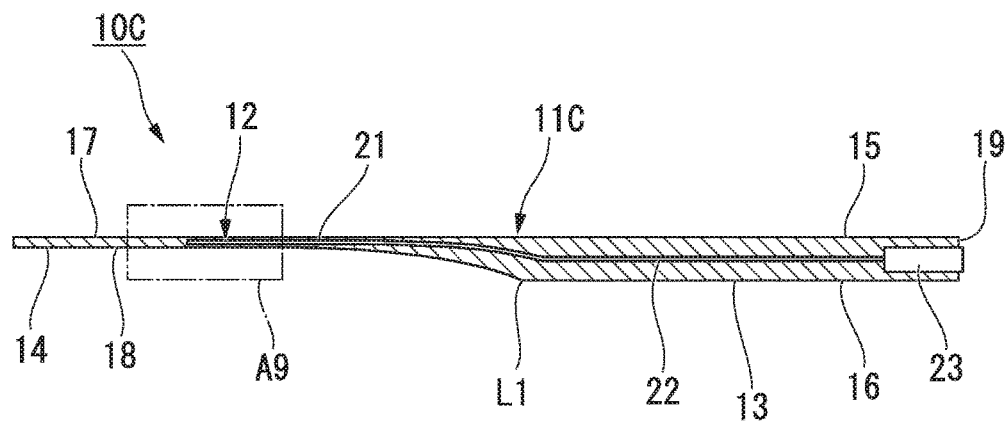
FIG. 9A is a cross-sectional view taken along the line IX-IX as viewed in the direction of the arrow shown in FIG. 8.
Figure 9B:
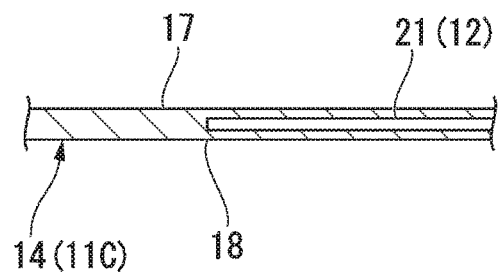
FIG. 9B is an enlarged view of a region A9 shown in FIG. 9A.
Figure 10:
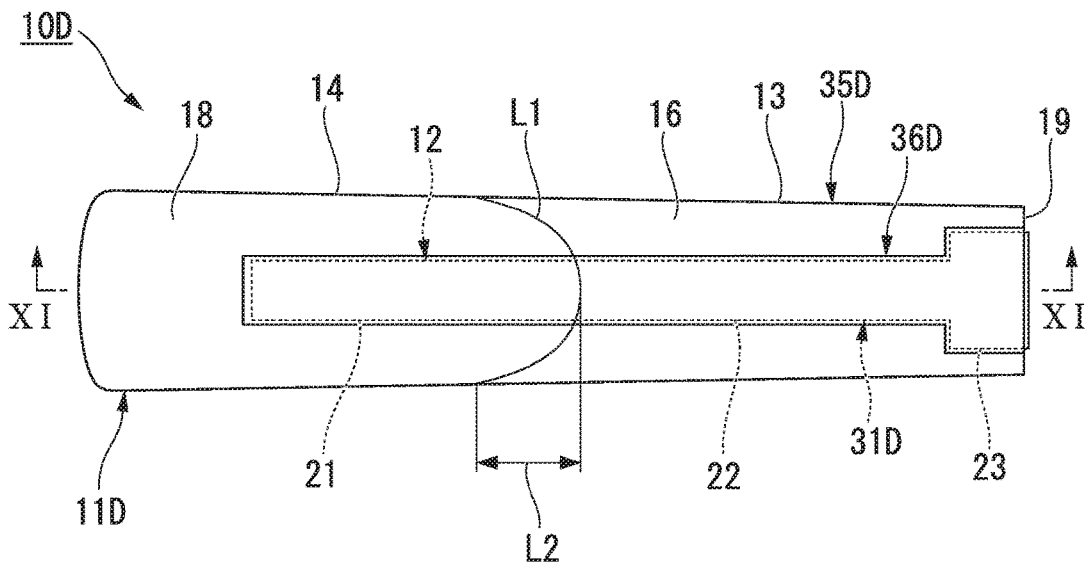
FIG. 10 is a schematic plan view of a second example of the reed according to the fourth embodiment of the present invention, as viewed from the outer surface side of the reed main body.
Figure 11A:
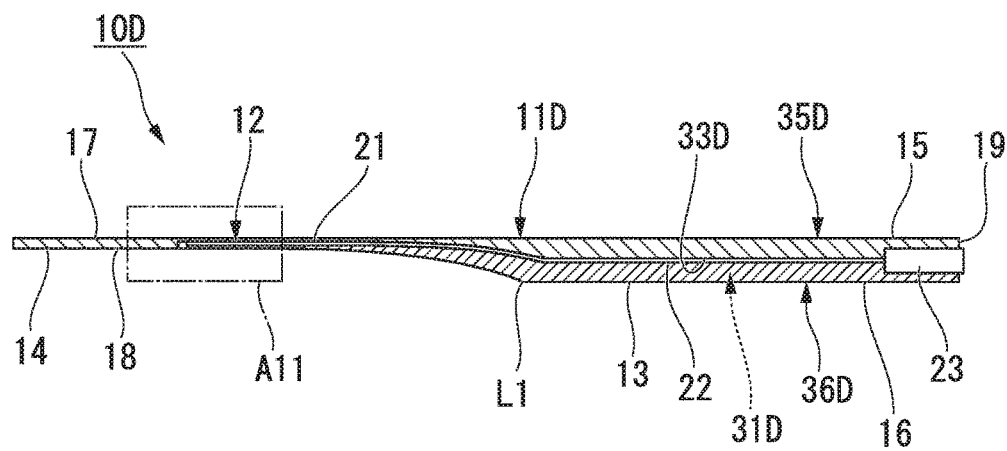
FIG. 11A is a cross-sectional view taken along the line XI-XI as viewed in the direction of the arrow shown in FIG. 10.
Figure 11B:
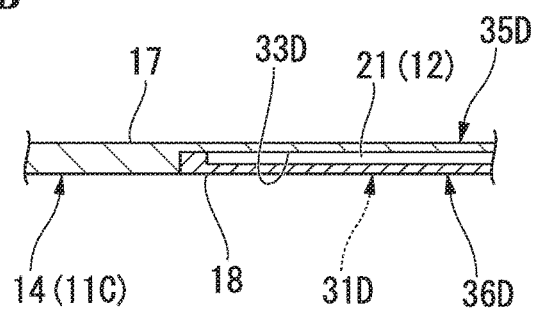
FIG. 11B is an enlarged view of a region A11 shown in FIG. 11A.
Figure 12:
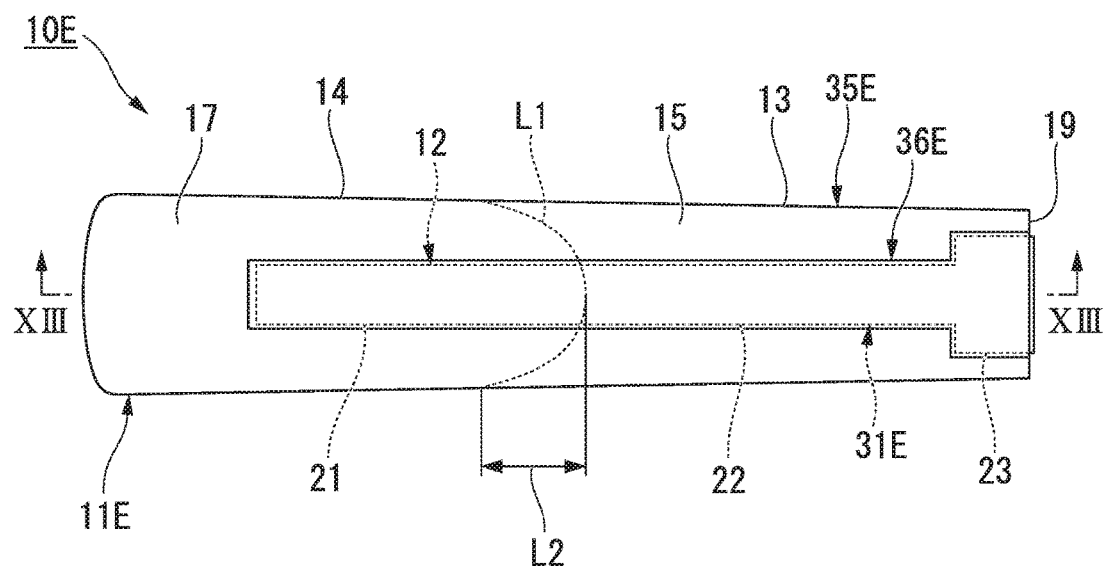
FIG. 12 is a schematic plan view of a third example of the reed according to the fourth embodiment of the present invention, as viewed from the inner surface side of the reed main body.
Figure 13A:
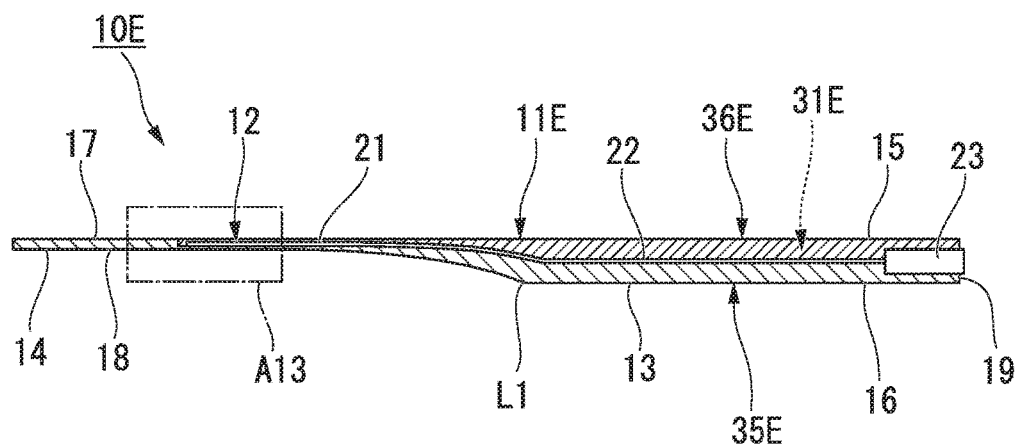
FIG. 13A is a cross-sectional view taken along the line XIII-XIII as viewed in the direction of the arrow shown in FIG. 12.
Figure 13B:
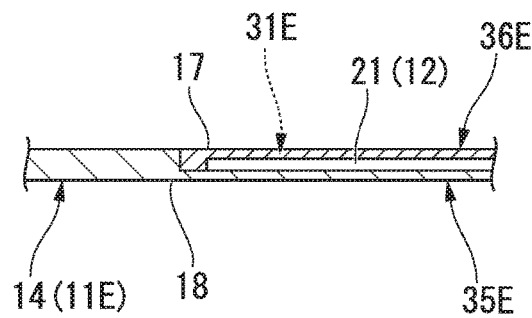
FIG. 13B is an enlarged view of a region A13 shown in FIG. 13A.

FIGS. 8, 9A, and 9B show the reed 10C of a first example. FIGS. 10, 11A, and 11B show the reed 10D of a second example. FIGS. 12, 13A, and 13B show the reed 10E of a third example. In the reeds 10C to 10E of the first to third examples, the structures of the reed main bodies 11C, 11D, and 11E are different from each other. Hereunder, this point will be described.

In the reed 10C of the first example shown in FIGS. 8, 9A, and 9B, the reed main body 11C is integrally formed of a resin material. When manufacturing the reed 10C, for example, the reed main body 11C may be formed by means of injection molding or the like upon placing the sensor part 12 (the effective sensor portion 21 and the tail part 22 in particular) at a predetermined position in the mold.

In the reed 10D of the second example shown in FIGS. 10, 11A, and 11B, the reed main body 11D has an external shape similar to that of the normal reed. The reed main body 11D is composed of a first member 35D having a groove part 31D, and a second member 36D inserted into the groove part 31D of the first member 35D.

The external shape of the first member 35D excluding the groove part 31D is similar to that of the normal reed. The groove part 31D of the first member 35D is formed recessed from the outer surfaces 16, 18 of the reed main body 11D, as with the groove parts 31, 31A of the first and second embodiments. Moreover, the plan view shape and formation position of the groove part 31D of the first member 35D are generally similar to those of the groove parts 31, 31A of the first and second embodiments.

In the reed 10D of the second example, the entire sensor part 12 including the effective sensor portion 21 is accommodated in the groove part 31D. Therefore the second end in the lengthwise direction of the groove part 31D positioned in the vibrating part 14 is positioned distanced farther from the fixed part 13 than from a range of the vibrating part 14 (a range indicated by reference symbol L2 in FIG. 10) where the boundary line L1 between the fixed part 13 and the vibrating part 14 is formed, in the lengthwise direction of the reed main body 11D.

The depth dimension of the groove part 31D is set so that each part of the sensor part 12 is positioned intermediate of the reed main body 11D in the plate thickness direction of the reed main body 11D irrespective of the position in the lengthwise direction of the reed main body 11D. That is to say, the depth dimension of the groove part 31D is set approximately half the plate thickness of the reed main body 11D irrespective of the position in the lengthwise direction of the reed main body 11D.

The plate thickness of the reed main body 11D varies corresponding to the position in the lengthwise direction of the reed main body 11D particularly in the vibrating part 14. Therefore, the depth dimension of the groove part 31D varies depending on the position in the lengthwise direction of the reed main body 11D.

As with the second members 36A and 36B of the second and third embodiments, the second member 36D is inserted into the groove part 31D of the first member 35D, and covers the entire sensor part 12 including the effective sensor portion 21 accommodated in the groove part 31D. The second member 36B is formed so as to have an external shape similar to that of the normal reed without the sensor part 12, in the state where the second member 36D is attached to the first member 35D. Moreover, the second member 36D is formed so as to fill the space in the groove part 31D in which the entire sensor part 12 is accommodated.

When manufacturing the reed 10D of the second example, for example, after fixing the sensor part 12 (in particular the effective sensor portion 21 and the tail part 22) to the bottom surface 33D of the groove part 31D of the first member 35D by means of an adhesive agent, a double-sided tape or the like, the second member 36D may be fixed to the first member 35D and the sensor part 12 (in particular the effective sensor portion 21 and the tail part 22) by means of bonding, adhesion, welding, or the like.

The reed 10D of the second example may be manufactured by, for example, molding the first member 35D and the second member 36D made of a resin material by means of two-color molding. In this case, the reed 10D of the second example may be manufactured, for example, by disposing the sensor part 12 in a first mold, molding the first member 35D by means of injection molding or the like, and then disposing these first member 35D and the sensor part 12 in a separate second mold, and then molding the second member 36D.

Moreover, when manufacturing the reed 10D of the second example, for example, only one of the first member 35D and the second member 36D may be molded by means of injection molding or the like and may be fixed to the sensor part 12 at the same time, and the other one of the first member 35D and the second member 36D may be fixed to the sensor part 12 by means of bonding, adhesion, welding, or the like.

The method for manufacturing the reed 10D of the second example described above can also be applied to the reed 10B of the third embodiment mentioned above.

In the reed 10E of the third example shown in FIGS. 12, 13A, and 13B, the reed main body 11E has an external shape similar to that of the normal reed, as with the reed main body 11E of the second embodiment mentioned above. The reed main body 11E is composed of a first member 35E having a groove part 31E and a second member 36E inserted into the groove part 31E of the first member 35E.

The external shape of the first member 35E excluding the groove part 31E is similar to that of the normal reed. The groove part 31E of the first member 35E is formed similar to the groove part 31D of the second example except that it is formed recessed from the inner surfaces 15, 17 of the reed main body 11E.

The second member 36E is similar to the second member 36D of the second example except that it forms a part of the inner surfaces 15, 17 of the reed body 11E.

The reed 10E of the third example can be manufactured in a manner similar to that of the reed 10D of the second example.

According to the reeds 10C, 10D, and 10E of the fourth embodiment, an effect similar to those of the first to third embodiments is achieved.

Furthermore, according to the reeds 10C, 10D, and 10E of the fourth embodiment, not only the tail part 22 and the connector part 23, but also the effective sensor portion 21 is embedded in the vibrating part 14 of the reed main bodies 11C, 11D, and 11E. Therefore it is possible to reduce or eliminate irregularities on the inner surface 17 of the vibrating part 14 that forms the air blowing flow path FP together with the mouthpiece 3. Consequently, even if the effective sensor portion 21 is disposed in the vibrating part 14, changes in the vibration characteristics of the reeds 10C, 10D, and 10E can be suppressed or prevented. That is to say, it is possible to make the vibration characteristics of the reeds 10C, 10D, 10E the same as or very similar to those of the normal reed without the sensor part 12.

[Fifth Embodiment]

Next, a fifth embodiment of the present invention will be described with reference to FIGS. 14 and 15. A reed of the fifth embodiment differs from the reed of the third embodiment only in the configuration of the reed main body. The reed of the fifth embodiment is similar to the reed of the third embodiment with respect to other configurations. In the fifth embodiment, the same reference symbols are given to constituents similar to those in the first to fourth embodiments, and the descriptions thereof are omitted.

Figure 14:
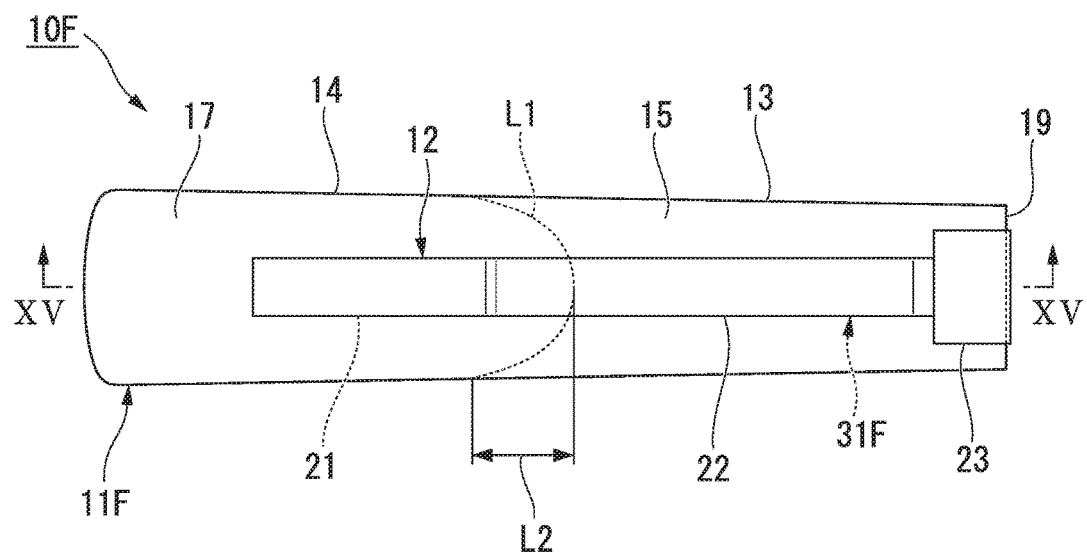
FIG. 14 is a schematic plan view of a reed according to a fifth embodiment of the present invention, as viewed from the inner surface side of a reed main body.
Figure 15:
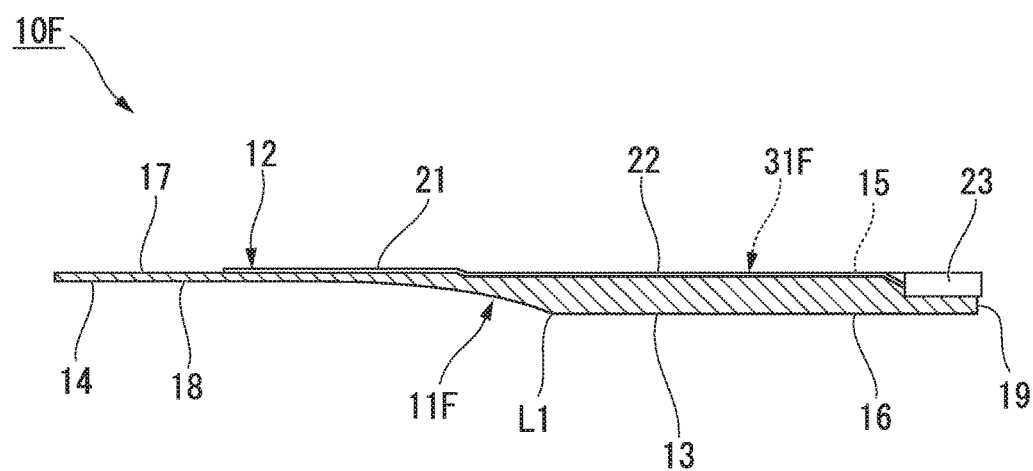
FIG. 15 is a cross-sectional view taken along the line XV-XV as viewed in the direction of the arrow shown in FIG. 14.

As shown in FIGS. 14 and 15, a reed 10F according to the fifth embodiment includes a reed main body 11F and a sensor part 12 as with the first to fourth embodiments. The reed main body 11F of the fifth embodiment is of a configuration similar to that of the first member 35B of the reed main body 11B of the third embodiment except for the setting of the depth dimension of the groove part 31F.

In the reed main body 11F of the fifth embodiment, in the groove part 31F that is formed recessed from the inner surfaces 15, 17 of the reed main body 11F there are accommodated the tail part 22 and the connector part 23 of the sensor part 12. That is to say, the tail part 22 and the connector part 23 are disposed inside the fixed part 13. The effective sensor portion 21 is disposed on the inner surface 17 of the vibrating part 14. The depth dimension of the groove part 31F is different between the accommodation region for the tail part 22 and the accommodation region for the connector part 23 in the groove part 31F, so as to correspond to the difference in thickness dimension between the tail part 22 and the connector part 23.

In the fifth embodiment, the depth dimension of the groove part 31F is set so that the tail part 22 and the connector part 23 accommodated in the groove part 31F form the same surface as the inner surfaces 15, 17 of the reed main body 11F.

In FIG. 14, the planar shape of the groove part 31F is formed in a manner similar to that in the first embodiment. However, for example it may be formed similarly to the third embodiment.

According to the reed 10F of the fifth embodiment, an effect similar to those of the first to fourth embodiments is achieved.

Moreover, according to the reed 10F of the fifth embodiment, the tail part 22 and the connector part 23 accommodated in the groove part 31F form the same surface as the inner surfaces 15, 17 of the reed main body 11F. Therefore, even if the reed main body 11F is not composed of two members, the irregularities due to the tail part 22 and the connector part 23 can be suppressed or prevented from appearing on the inner surfaces 15, 17 of the reed main body 11F. Consequently it is possible to ensure the airtightness of the air blowing flow path FP constituted by the mouthpiece 3 and the reed 10F. In addition, as compared to the case where the reed main body 11F is formed of two members, it is possible to obtain vibration characteristics close to those of the normal reed.

The present invention has been described in detail above. However, the present invention is not limited to the embodiments described above, and various modifications may be made within a range not departing from the scope of the present invention.

In the reed 10 of the first embodiment having the through hole 32, for example, the groove part 31 recessed from the outer surface 16 of the fixed part 13 need not be formed. That is to say, in the reed 10 of the first embodiment, the tail part 22 and the connector part 23 of the sensor part 12 may be disposed for example on the outer surface 16 of the fixed part 13. Also, in this case, it is possible to easily position the effective sensor portion 21 on the inner surface 17 side of the reed main body 11, and also to position the tail part 22 on the outer surface 16 side of the reed main body 11. Moreover, since the step of forming the groove part 31 in the reed main body 11 becomes unnecessary, it is possible to easily manufacture the reed main body 10 (in particular the reed main body 11).

In the reeds 10, 10A, and 10F of the first, second, and fifth embodiments, the effective sensor portion 21 may be fixed for example to the bottom surface of a groove part that is formed recessed from the inner surface 17 of the vibrating part 14. That is to say, the effective sensor portion 21 may be disposed inside of the vibrating part 14. In this case, for example, the effective sensor portion 21 positioned in the groove part may form the same surface with the inner surface 17 of the vibrating part 14, or may be positioned recessed from the inner surface 17 of the vibrating part 14.

In the case where the effective sensor portion 21 forms the same surface with the inner surface 17 of the vibrating part 14, it is possible to reduce or eliminate irregularities on the inner surface 17 of the vibrating part 14 that forms the air blowing flow path FP. Consequently, even if the effective sensor portion 21 is disposed in the vibrating part 14, changes in the vibration characteristics of the reeds 10, 10A, and 10F can be suppressed or prevented.

In the reeds 10B to 10F of the third to fifth embodiments, the effective sensor portion 21 and the tail part 22 having the same function as the effective sensor portion 21 may be fixed to the vibrating part 14, for example, by sequentially laminating the vibrating part 14 with the material that forms the sensor part 12, by means of a coating or deposition method.

In the reed according to the embodiments of the present invention, the connector part may be exposed for example to the outside from the side surface of the fixed part in the widthwise direction of the reed main body, or may be exposed for example to the outside from the outer surface of the fixed part.

In the case of exposing the connector part to the outside from the side surface of the fixed part, the groove part of the first member accommodating the connector part may open to the side surface of the fixed part. Furthermore, in the case of exposing the connector part to the outside from the side surface of the fixed part, the groove part of the first member need not open for example to the end surface or the side surface of the fixed part.

In the reed according to the embodiments of the present invention, for example, a part of the tail part may be arranged inside the fixed part, and the rest of the tail part may be arranged protruding outward from the fixed part. In this case, the connector part is positioned distanced from the reed main body. In this type of reed, for example, the tail part may include both a detection part which is disposed inside the fixed part and that detects vibrations of the reed main body in a manner similar to that of the effective sensor portion, and an electrical wiring part which is electrically connected to the detection part and that extends toward the outside of the fixed part, or for example it may include the electrical wiring part only.

The present invention may be applied to a reed.

What is claimed is:

1. A reed comprising:
   a reed main body having a plate shape, the reed main body comprising a fixed part fixed to a mouthpiece, and a vibrating part that extends from the fixed part and vibrates; and
   a sensor part that is disposed inside the vibrating part or on an inner surface of the vibrating part, the inner surface of the vibrating part facing the mouthpiece, the sensor part comprising an effective sensor portion that detects vibration of the vibrating part, and the effective sensor portion being fixed to the vibrating part.

2. The reed according to claim 1,
   wherein the sensor part further comprises a tail part that extends from the effective sensor portion, and
   the tail part is disposed inside of the fixed part or on an outer surface of the fixed part, the outer surface of the fixed part facing away from the inner surface.

3. The reed according to claim 2, wherein the tail part is embedded in the fixed part.

4. The reed according to claim 2,
   wherein the reed main body comprises:
   a first member comprising a groove part that is recessed from an inner surface of the fixed part or from the outer surface of the fixed part, the inner surface of the fixed part being in contact with the mouth piece, the outer surface of the fixed part facing away from the inner surface of the fixed part, the groove part accommodating the tail part; and
   a second member that is inserted in the groove part and covers the tail part.

5. The reed according to claim 1, wherein the vibrating part comprises a through hole that penetrates in a thickness direction of the reed main body, and through which the sensor part is inserted.

6. The reed according to claim 1, wherein the effective sensor portion faces an opening of the mouthpiece via the vibrating part of the reed main body, or directly.

7. The reed according to claim 1, wherein the vibrating part of the reed main body is out of contact with the mouthpiece, in a state where the vibrating part of the reed main body is not vibrating.

8. The reed according to claim 1, wherein the vibrating part of the reed main body is out of contact with the mouthpiece, in a state where the vibrating part of the reed main body is stationary.

9. The reed according to claim 1, wherein the effective sensor portion is formed in a film shape.

10. A reed comprising:
- a reed main body having a plate shape, the reed main body comprising a fixed part fixed to a mouthpiece, and a vibrating part that extends from the fixed part and vibrates,
- wherein the vibrating part comprises a through hole that penetrates in a thickness direction of the reed main body, and through which a sensor part is inserted, the sensor part detecting vibration of the vibrating part.

* * * * *